United States Patent
Chien et al.

(10) Patent No.: US 10,246,117 B1
(45) Date of Patent: Apr. 2, 2019

(54) HAND-DRIVEN, WHEELED CARRIER DECELERATION DEVICE AND HAND-DRIVEN, WHEELED CARRIER HAVING THE SAME

(71) Applicants: Li-Sheng Chien, Taipei (TW); Chien-Chang Ho, Taipei (TW)

(72) Inventors: Li-Sheng Chien, Taipei (TW); Chien-Chang Ho, Taipei (TW)

( * ) Notice: Subject to any disclaimer, the term of this patent is extended or adjusted under 35 U.S.C. 154(b) by 0 days.

(21) Appl. No.: 16/059,111

(22) Filed: Aug. 9, 2018

(51) Int. Cl.
*B62B 5/00* (2006.01)
*B62B 5/06* (2006.01)

(52) U.S. Cl.
CPC ............ *B62B 5/004* (2013.01); *B62B 5/0043* (2013.01); *B62B 5/0066* (2013.01); *B62B 5/06* (2013.01); *B62B 2301/04* (2013.01); *B62B 2301/254* (2013.01)

(58) Field of Classification Search
CPC .............................. B62B 5/004; B62B 5/0043
See application file for complete search history.

(56) References Cited

U.S. PATENT DOCUMENTS

| | | | | |
|---|---|---|---|---|
| 8,922,154 B2 * | 12/2014 | Bangura | ............... | H02K 21/046 |
| | | | | 310/103 |
| 9,969,212 B2 * | 5/2018 | Lin | ......................... | B60B 21/08 |
| 2007/0041817 A1 * | 2/2007 | Kakinuma | ............ | B62B 5/0026 |
| | | | | 414/490 |
| 2007/0090702 A1 * | 4/2007 | Schiller | .................... | A45C 5/14 |
| | | | | 310/75 C |
| 2015/0197271 A1 * | 7/2015 | Vashdi | ...................... | B62B 9/22 |
| | | | | 180/166 |
| 2018/0236367 A1 * | 8/2018 | Bills | ........................ | B60K 1/02 |

* cited by examiner

*Primary Examiner* — Brian L Swenson
(74) *Attorney, Agent, or Firm* — Schmeiser, Olsen & Watts, LLP

(57) ABSTRACT

A hand-driven, wheeled carrier deceleration device, applied to an axle of a hand-driven, wheeled carrier, is introduced and has a wheel, driven gear, reluctance motor and resistive component. The wheel, pivotally disposed at the axle, has a drive gear which rotates together with the wheel. The driven gear, disposed beside the axle, meshing with and driven by the drive gear, has a connection portion. The reluctance motor, connected to the connection portion and driven by the driven gear, has permanent magnets and metal elements. The metal elements and permanent magnets are arranged annularly. The metal elements rotate relative to the permanent magnets. The resistive component electrically connects to the permanent magnets. Therefore, a driving force exerted on the hand-driven, wheeled carrier is partially offset by reluctance to effectively slow down the hand-driven, wheeled carrier.

15 Claims, 6 Drawing Sheets

HAND-DRIVEN, WHEELED CARRIER DECELERATION DEVICE AND HAND-DRIVEN, WHEELED CARRIER HAVING THE SAME

FIELD OF THE INVENTION

The present disclosure relates to hand-driven, wheeled carrier deceleration devices and hand-driven, wheeled carriers having the same and, more particularly, to a hand-driven, wheeled carrier deceleration device capable of cushioning by a reluctance while moving and a hand-driven, wheeled carrier having the same.

BACKGROUND OF THE INVENTION

Conventional hand-driven, wheeled carriers, such as shopping carts, strollers, walkers and wheelchairs, are not only always capable of carrying goods and human beings, but are also sometimes capable of stopping.

However, existing hand-driven, wheeled carriers can only switch between a free movement mode and a stop mode. Hence, they lack a mechanism for achieving deceleration as needed. For instance, users have to push harder the conventional hand-driven, wheeled carriers moving up a slope in order not to be overwhelmed by the conventional hand-driven, wheeled carriers. As a result, the conventional hand-driven, wheeled carriers pose a safety risk.

When it comes to a downward slope, the safety risk is even more intractable. Pulling the carriers while moving the carriers down the slope is a laborious job. Furthermore, a failure to catch a carrier rushing down a slope out of control is not uncommon among users, nor is it danger-free especially when the carriers are wheelchairs and strollers (whose riders are slower than average adults in responding.)

SUMMARY OF THE INVENTION

To overcome the aforesaid drawbacks of existing hand-driven, wheeled carriers, the present disclosure provides a hand-driven, wheeled carrier deceleration device and a hand-driven, wheeled carrier having the same, applying resistance to an axle of the hand-driven, wheeled carrier by a reluctance motor operating in conjunction with a resistive component, so as to render the hand-driven, wheeled carrier capable of deceleration-oriented cushioning.

The present disclosure provides, in an embodiment, a hand-driven, wheeled carrier deceleration device, applied to an axle of a hand-driven, wheeled carrier. The hand-driven, wheeled carrier deceleration device includes a wheel, a driven gear, a reluctance motor and a resistive component. The wheel is pivotally disposed at the axle. The wheel includes a drive gear. The drive gear rotates together with the wheel. The driven gear is disposed beside the axle, meshes with the drive gear, is driven by the drive gear, and has a connection portion. The reluctance motor is connected to the connection portion and driven by the driven gear. The reluctance motor includes a plurality of permanent magnets and a plurality of metal elements. The metal elements and the permanent magnets are arranged annularly. The metal elements rotate relative to the permanent magnets. The resistive component electrically connects to the permanent magnets.

When the hand-driven, wheeled carrier moves, the drive gear not only rotates and drives the driven gear but also indirectly drives the reluctance motor by the connection portion. When the reluctance motor rotates, the metal elements rotate relative to the permanent magnets such that eddy current is generated between each of the metal elements and a corresponding one of the permanent magnets, so as to generate another magnetic field whereby the permanent magnets are attracted to the permanent magnets. Since a magnetic damping effect is generated because of continuous attraction of the rotating metal elements to the permanent magnets, the reluctance motor offsets a portion of the torque of the drive gear and thus effectively slows down the hand-driven, wheeled carrier.

The drive gear is a ring gear or a sun gear, but the present disclosure is not limited thereto.

In an embodiment, the resistive component includes a variable resistor, whereas the hand-driven, wheeled carrier deceleration device further includes a controller. The controller is connected to the resistive component to adjust the resistance of the resistive component.

With the resistive component's resistance being adjustable, the strength of the eddy current (magnetic attractive force) between each of the permanent magnets and a corresponding one of the metal elements is variable. Therefore, rotation resistance of the reluctance motor varies to different degrees, so as to achieve multiple-step deceleration.

In an embodiment, the hand-driven, wheeled carrier deceleration device further includes a casing. The casing is not only disposed beside the wheel but also shields the drive gear and the driven gear. Owing to the casing, all the components of the hand-driven, wheeled carrier deceleration device can be integrated into a single product to therefore simplify a user assembly process and augment the ease of maintenance carried out by manufacturers.

The hand-driven, wheeled carrier deceleration device further includes a transmission gear train. The reluctance motor is connected to the transmission gear train first. Then, the reluctance motor is connected to the connection portion through the transmission gear train. For instance, the transmission gear train includes a sun gear and a plurality of planet gears. The sun gear is connected to the reluctance motor to drive the reluctance motor. The planet gears mesh with the sun gear. The planet gears have a greater gear number than the sun gear. Therefore, in addition to the drive gear and driven gear, the present disclosure uses the planet gears and sun gear to further augment the torque of the reluctance motor.

The reluctance motor resists the drive gear's torque by reluctance generated as a result of the rotation of the reluctance motor about its own internal axis; hence, the hand-driven, wheeled carrier deceleration device does not need any external power source and thus is not subject to any limitation of duration of use. The reluctance motor even functions as a power generator. For instance, the hand-driven, wheeled carrier deceleration device further includes a power storage unit. The power storage unit is electrically connected to the reluctance motor and receives electric power from the reluctance motor during rotation thereof. The power storage unit is also applicable to the hand-driven, wheeled carrier deceleration device equipped with the transmission gear train. The hand-driven, wheeled carrier deceleration device further includes an electronic apparatus connected to the power storage unit.

Therefore, the hand-driven, wheeled carrier deceleration device applies electric power (generated as a result of the wheel's driving the reluctance motor) to the other applications. For instance, the electronic apparatus is an illuminating lamp for sending an illumination alert or a display unit for displaying the resistance level of the hand-driven, wheeled carrier deceleration device.

The present disclosure, in another embodiment, provides a hand-driven, wheeled carrier. The hand-driven, wheeled carrier includes a chassis and a plurality of the hand-driven, wheeled carrier deceleration devices. The chassis has a plurality of axle. The hand-driven, wheeled carrier deceleration devices are in a number smaller than or equal to the axle. The hand-driven, wheeled carrier deceleration devices have their respective axle.

Technical features and advantages of the hand-driven, wheeled carrier deceleration devices in a further embodiment are the same as those in the first embodiment and thus are, for the sake of brevity, not described herein again.

DETAILED DESCRIPTION OF THE PREFERRED EMBODIMENTS

Objectives, features, and advantages of the present disclosure are hereunder illustrated with specific embodiments, depicted by the accompanying drawings, and described in detail below.

Figure 1:
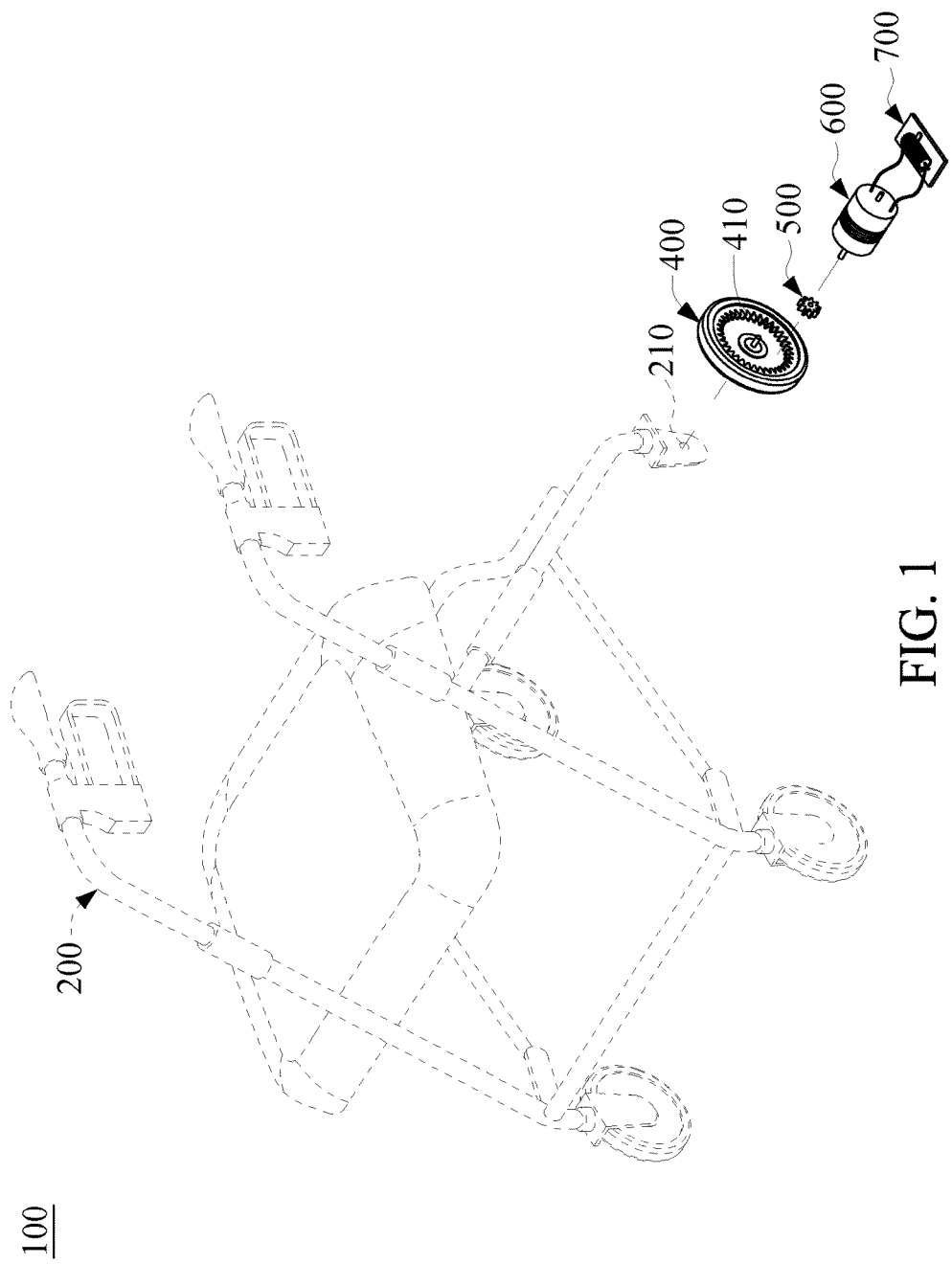
FIG. 1 is an exploded view of a hand-driven, wheeled carrier deceleration device according to an embodiment of the present disclosure.

Referring to FIG. 1, a hand-driven, wheeled carrier deceleration device 300 is applied to a hand-driven, wheeled carrier 100. The hand-driven, wheeled carrier 100 has a chassis 200 including a plurality of axles 210. The hand-driven, wheeled carrier deceleration device 300, which is in the number of one or in a plural number, is mounted on some or all of the axles 210.

Figure 2A:
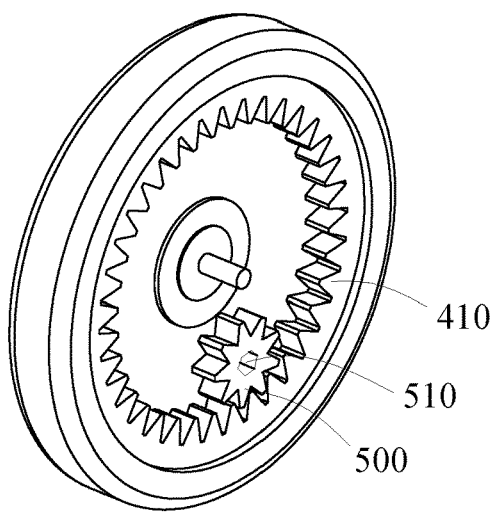
FIG. 2A is a schematic view of a drive gear and a driven gear of the hand-driven, wheeled carrier deceleration device of FIG. 1.
Figure 2B:
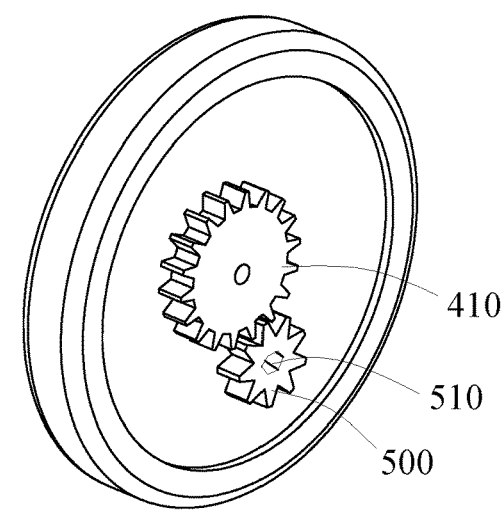
FIG. 2B is another schematic view of the drive gear and the driven gear of the hand-driven, wheeled carrier deceleration device of FIG. 1.

As shown in FIG. 1, the hand-driven, wheeled carrier deceleration device 300 includes a wheel 400, a driven gear 500, a reluctance motor 600 and a resistive component 700. Referring to FIG. 2A and FIG. 2B, the wheel 400 is pivotally disposed at the axle 210 of the chassis 200. As soon as the hand-driven, wheeled carrier 100 is pushed, the wheel 400 rotates relative to the axle 210. As shown in FIG. 2A and FIG. 2B, the wheel 400 includes a drive gear 410. The drive gear 410 is a ring gear shown in FIG. 2A or a sun gear shown in FIG. 2B. The driven gear 500 is disposed beside the axle 210 and thus meshes with the drive gear 410. As soon as the wheel 400 rotates, the drive gear 410 drives the driven gear 500 to rotate. Referring to FIG. 2A, FIG. 2B, FIG. 3A through FIG. 4B, the driven gear 500 has a connection portion 510. The reluctance motor 600 is insertedly connected to the driven gear 500 through the connection portion 510 such that the driving power from the driven gear 500 is transmitted to the reluctance motor 600.

Figure 3A:
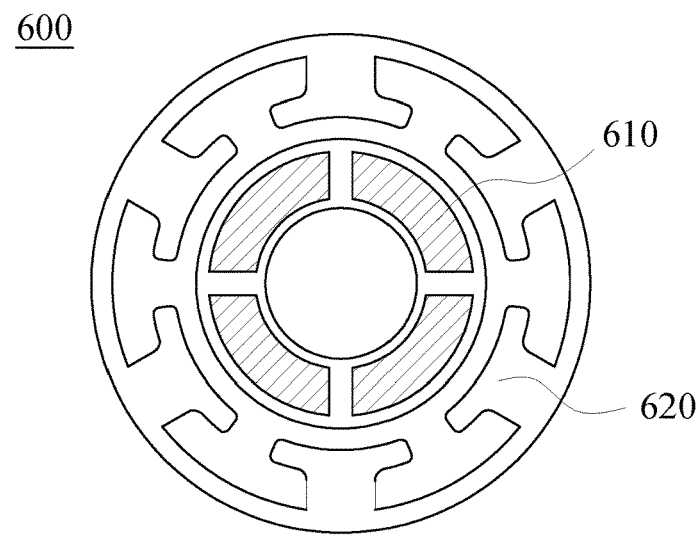
FIG. 3A is a schematic view of a reluctance motor of the hand-driven, wheeled carrier deceleration device of FIG. 1.
Figure 3B:
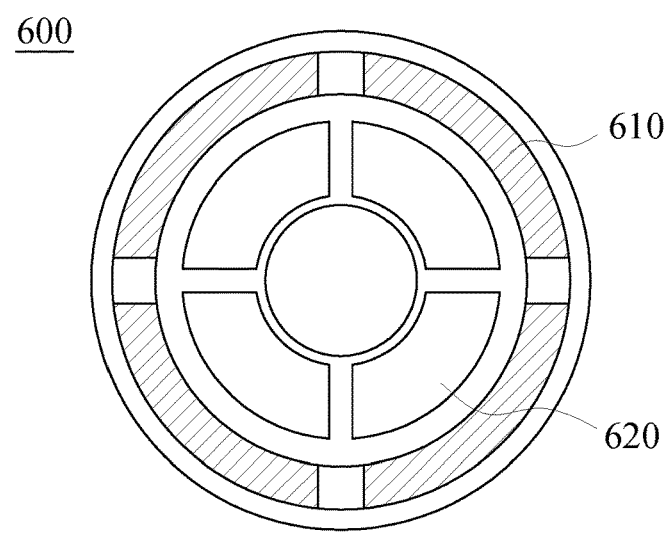
FIG. 3B is another schematic view of the reluctance motor of the hand-driven, wheeled carrier deceleration device of FIG. 1.

The reluctance motor 600 includes a plurality of permanent magnets 610 and a plurality of metal elements 620. The metal elements 620 correspond in position to the permanent magnets 610, respectively. The metal elements 620 rotate relative to the permanent magnets 610. As shown in FIG. 3A, the metal elements 620 enclose the permanent magnets 610 collectively. As shown in FIG. 3B, the metal elements 620 are enclosed by the permanent magnets 610 collectively. The resistive component 700 is electrically connected to the reluctance motor 600. Whenever the metal elements 620 rotate, free electrons on the surfaces of the metal elements 620 move relative to the permanent magnets 610 to thereby cause a change in the magnetic field of the permanent magnets 610. Every magnetic field tends to resist a change of state; hence, eddy current is generated between each of the permanent magnets 610 and a corresponding one of the metal elements 620, so as to generate another magnetic field whereby the metal elements 620 are attracted to the permanent magnets 610. In this embodiment, given the magnetic damping of the reluctance motor 600, the drive gear 410 is subjected to a torque resistance.

Figure 4A:
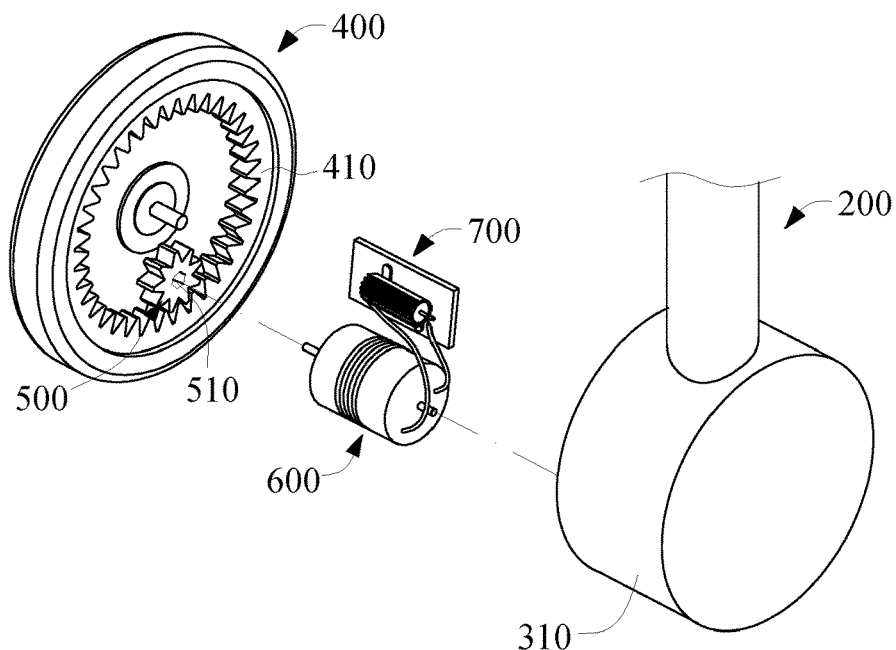
FIG. 4A is a schematic view of how to connect the reluctance motor to the driven gear.
Figure 4B:
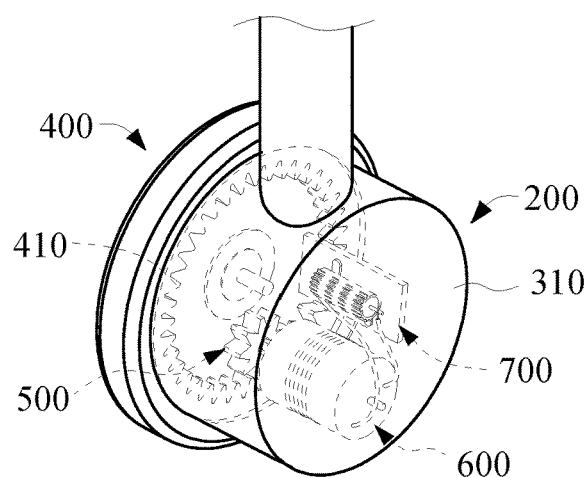
FIG. 4B is a schematic view of how to drive the reluctance motor by a wheel of the hand-driven, wheeled carrier deceleration device.

The hand-driven, wheeled carrier deceleration device 300 is constantly capable of deceleration-oriented cushioning, because reluctance need not be driven by additional electric power. Another advantage of this embodiment is: the drive gear 410 directly substitutes for the rim of an existing hand-driven, wheeled carrier 100 and thus is highly multi-usable. Furthermore, the driven gear 500 is disposed beside the axle 210 and thus can be directly received within the rim without markedly adding to the volume of the wheel 400 of the hand-driven, wheeled carrier 100. As shown in FIG. 4A and FIG. 4B, the hand-driven, wheeled carrier deceleration device 300 includes a casing 310. The casing 310 is not only disposed beside the wheel 400 but also shields the drive gear 410 and the driven gear 500. To render assembly and sale easy, the casing 310 takes on the shape shown in FIG. 4A and FIG. 4B such that both the reluctance motor 600 and the resistive component 700 are completely enclosed in the hand-driven, wheeled carrier deceleration device 300.

Figure 5:
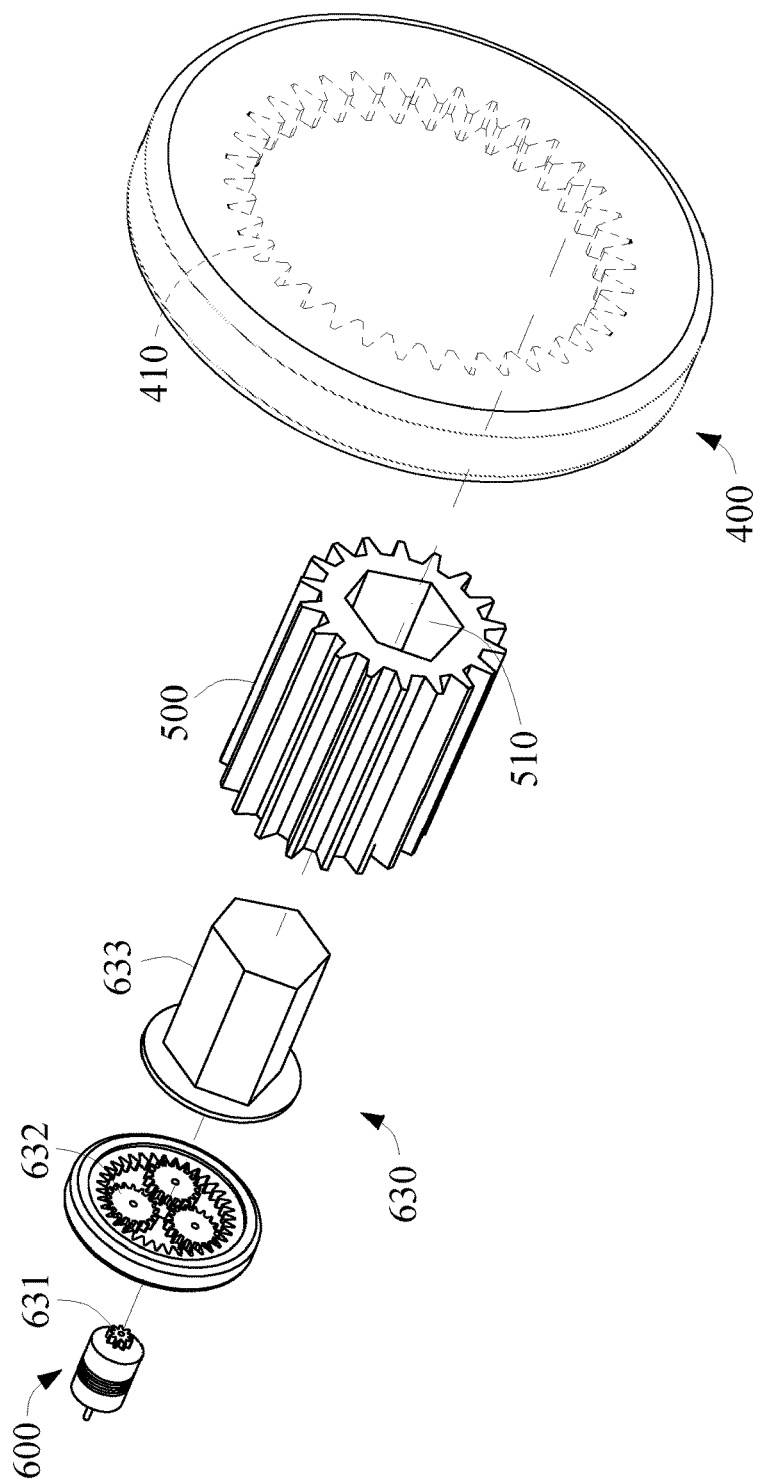
FIG. 5 is an exploded view, showing how to pull together the reluctance motor, a transmission gear train, and the driven gear.

Referring to FIG. 5, the hand-driven, wheeled carrier deceleration device 300 further includes a transmission gear train 630. The reluctance motor 600 is connected to the transmission gear train 630 and then connected indirectly to the connection portion 510 of the driven gear 500. The transmission gear train 630 is a combination of a sun gear 631 and a plurality of planet gears 632, with the sun gear 631 meshing with the planet gears 632, and the planet gears 632 having a greater gear number than the sun gear 631. The connection portion 510 is connected to an adapter 633 and then to the plurality of planet gears 632; hence, as soon as the driven gear 500 is driven to rotate, the transmission gear train 630 indirectly drives the reluctance motor 600. The transmission gear train 630 amplifies the torque of the reluctance motor 600 and thus augments the deceleration-oriented cushioning performed with the hand-driven, wheeled carrier deceleration device 300

Figure 6:
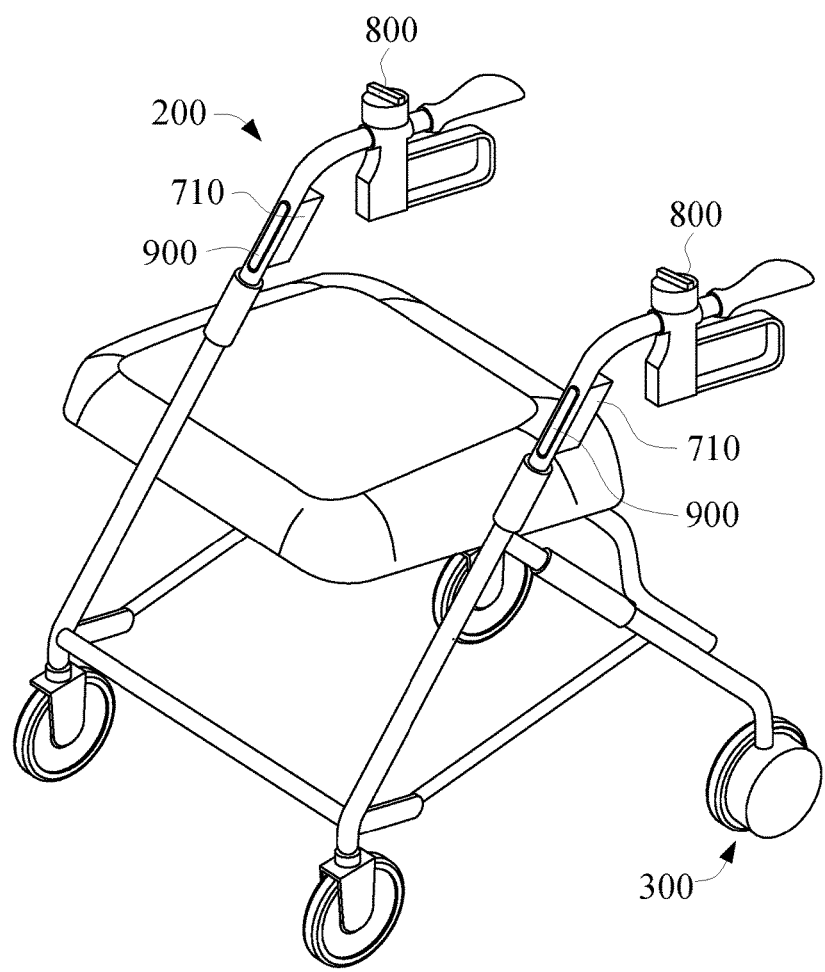
FIG. 6 is a perspective view of a hand-driven, wheeled carrier according to another embodiment of the present disclosure.

Referring to FIG. 6, the hand-driven, wheeled carrier deceleration device 300 further includes a power storage unit 710. The power storage unit 710 is electrically connected to the reluctance motor 600 and receives power from the reluctance motor 600 during rotation thereof. Therefore, when the hand-driven, wheeled carrier 100 is out of control while moving upward or downward a slope, the hand-driven, wheeled carrier deceleration device 300 not only prevents the hand-driven, wheeled carrier 100 from skidding down quickly, but also converts the gravitational potential energy of the hand-driven, wheeled carrier 100 into electrical energy by the reluctance motor 600 and then stores the electrical energy in the power storage unit 710.

Although its operation is not electrically powered, the hand-driven, wheeled carrier deceleration device 300 makes good use of the stored electrical power. For instance, the hand-driven, wheeled carrier deceleration device 300 further includes an electronic apparatus 900. The hand-driven, wheeled carrier deceleration device 300, the electronic apparatus 900 and the power storage unit 710 are mounted on the hand-driven, wheeled carrier 100 shown in FIG. 6. The electronic apparatus 900 is an illumination apparatus, such as an LED lamp, for sending an alert at night. The metal elements 620 rotate relative to the permanent magnets 610 and thus effectuate a magnetic damping effect to therefore stop the metal elements 620 from rotating. The strength of magnetic damping depends on the strength of the magnetic field. Therefore, the resistive component 700 includes a variable resistor. A change in the resistance of the resistive component 700 results in a change in the current generated as a result of electromagnetic induction of the permanent magnets 610, so as to indirectly control the magnetic attractive force exerted by the permanent magnets 610 on the metal elements 620. In this regard, the hand-driven, wheeled carrier deceleration device 300 further includes a controller 800 for adjusting the resistance of the resistive component 700. In another embodiment, the electronic apparatus 900 is a display unit for displaying the strength of instantaneous resistance. The electronic apparatus 900 may also be implemented as any other appropriate products; hence, the above-mentioned is not restrictive of the power storage unit 710 and the electronic apparatus 900 in terms of specifications, positions and application.

In the aforesaid embodiments and further embodiments, the present disclosure effectively prevents the hand-driven, wheeled carrier from undergoing a quick skid which might otherwise happen if the hand-driven, wheeled carrier moving upward or downward along a slope gets out of control and thus skids downward quickly. Furthermore, the present disclosure effectively renders the hand-driven, wheeled carrier more comfortable. Moreover, the hand-driven, wheeled carrier deceleration device can be mounted on the rim of any existing hand-driven, wheeled carrier or directly substitutes for any existing hand-driven, wheeled carrier and thus is highly multi-usable. Last but not least, the present disclosure makes good use of the internal space of the wheels of the hand-driven, wheeled carrier such that the hand-driven, wheeled carrier deceleration device functions as a small-sized power generator for supplying power to electronic apparatuses in the vicinity of the hand-driven, wheeled carrier on an auxiliary basis.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. A hand-driven, wheeled carrier deceleration device, applied to an axle of a hand-driven, wheeled carrier, the hand-driven, wheeled carrier deceleration device comprising:
    a wheel pivotally disposed at the axle, the wheel comprising:
        a drive gear rotating together with the wheel;
    a driven gear disposed beside the axle, meshing with the drive gear, driven by the drive gear, and having a connection portion;
    a reluctance motor connected to the connection portion and driven by the driven gear, the reluctance motor comprising:
        a plurality of permanent magnets; and
        a plurality of metal elements, wherein the metal elements and the permanent magnets are arranged annularly, and the metal elements rotate relative to the permanent magnets; and
    a resistive component electrically connected to the permanent magnets.

2. The hand-driven, wheeled carrier deceleration device of claim 1, wherein the drive gear is a ring gear or a sun gear.

3. The hand-driven, wheeled carrier deceleration device of claim 1, wherein the resistive component is a variable resistor, and the hand-driven, wheeled carrier deceleration device further comprises a controller connected and adapted to adjust resistance of the resistive component.

4. The hand-driven, wheeled carrier deceleration device of claim 1, further comprising a casing disposed at the wheel and adapted to shield the drive gear and the driven gear.

5. The hand-driven, wheeled carrier deceleration device of claim 1, further comprising a transmission gear train, with the reluctance motor connected to the transmission gear train and thus connected indirectly to the connection portion.

6. The hand-driven, wheeled carrier deceleration device of claim 5, wherein the transmission gear train comprises:
    a sun gear connecting to and driving the reluctance motor; and
    a plurality of planet gears meshing with the sun gear, wherein the planet gears have a greater gear number than the sun gear.

7. The hand-driven, wheeled carrier deceleration device of claim 6, further comprising a power storage unit connected electrically to the reluctance motor and adapted to receive electric power whenever the reluctance motor rotates.

8. The hand-driven, wheeled carrier deceleration device of claim 7, further comprising an electronic apparatus connected to the power storage unit.

9. The hand-driven, wheeled carrier deceleration device of claim 8, wherein the electronic apparatus is an illuminating lamp or a display unit.

10. A hand-driven, wheeled carrier, comprising:
    a chassis having a plurality of axles; and
    a plurality of said hand-driven, wheeled carrier deceleration devices of claim 7, wherein the hand-driven, wheeled carrier deceleration devices are in a number less than or equal to the axles, and each said hand-driven, wheeled carrier deceleration device corresponds in position to one said axle.

11. The hand-driven, wheeled carrier deceleration device of claim 1, further comprising a power storage unit connected electrically to the reluctance motor and adapted to receive electric power whenever the reluctance motor rotates.

12. The hand-driven, wheeled carrier deceleration device of claim 11, further comprising an electronic apparatus connected to the power storage unit.

13. The hand-driven, wheeled carrier deceleration device of claim 12, wherein the electronic apparatus is an illuminating lamp or a display unit.

14. A hand-driven, wheeled carrier, comprising:
a chassis having a plurality of axles; and
a plurality of said hand-driven, wheeled carrier deceleration devices of claim 11, wherein the hand-driven, wheeled carrier deceleration devices are in a number less than or equal to the axles, and each said hand-driven, wheeled carrier deceleration device corresponds in position to one said axle.

15. A hand-driven, wheeled carrier, comprising:
a chassis having a plurality of axles; and
a plurality of said hand-driven, wheeled carrier deceleration devices of claim 1, wherein the hand-driven, wheeled carrier deceleration devices are in a number less than or equal to the axles, and each said hand-driven, wheeled carrier deceleration device corresponds in position to one said axle.

\* \* \* \* \*